United States Patent
Day et al.

(10) Patent No.: US 11,509,947 B2
(45) Date of Patent: *Nov. 22, 2022

(54) GEOLOCATION OF SET-TOP BOXES USING MACHINE LEARNING

(71) Applicant: Dish Technologies L.L.C., Englewood, CO (US)

(72) Inventors: Christopher Day, Denver, CO (US); Rima Shah, Thornton, CO (US)

(73) Assignee: DISH Technologies L.L.C., Englewood, CO (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/402,590

(22) Filed: May 3, 2019

(65) Prior Publication Data

US 2019/0261040 A1    Aug. 22, 2019

Related U.S. Application Data

(63) Continuation of application No. 15/588,213, filed on May 5, 2017, now Pat. No. 10,327,022.

(51) Int. Cl.
| | |
|---|---|
| H04N 21/258 | (2011.01) |
| H04N 21/454 | (2011.01) |
| H04N 21/6332 | (2011.01) |
| H04N 21/442 | (2011.01) |
| H04N 21/45 | (2011.01) |
| H04N 21/6547 | (2011.01) |
| H04N 21/61 | (2011.01) |

(52) U.S. Cl.
CPC . *H04N 21/25841* (2013.01); *H04N 21/44209* (2013.01); *H04N 21/4524* (2013.01); *H04N 21/4542* (2013.01); *H04N 21/6332* (2013.01); *H04N 21/6547* (2013.01); *H04N 21/6143* (2013.01)

(58) Field of Classification Search
None
See application file for complete search history.

(56) References Cited

U.S. PATENT DOCUMENTS

| | | | |
|---|---|---|---|
| 2003/0163832 A1* | 8/2003 | Tsuria | H04N 21/812 725/135 |
| 2010/0071011 A1* | 3/2010 | Addair | H04N 21/6582 725/107 |
| 2011/0004893 A1 | 1/2011 | Borislow et al. | |
| 2011/0023074 A1 | 1/2011 | Nguyen | |
| 2011/0041149 A1* | 2/2011 | Piepenbrink | H04N 21/482 725/28 |
| 2013/0174192 A1* | 7/2013 | Lee | H04N 21/25841 725/25 |

(Continued)

*Primary Examiner* — Jason K Lin
(74) *Attorney, Agent, or Firm* — Seed Intellectual Property Law Group LLP (57) ABSTRACT

Various embodiments provide a system and methods for generating geographical models, determining geographical locations of set-top boxes using the geographical models, and modifying behavior of the set-top boxes based on their geographical locations. The set-top boxes determine their own geographical locations, regardless of whether the set-top boxes are capable of transmitting data to a content provider or include specialized equipment, such as a global positioning system, for determining geographical location.

20 Claims, 4 Drawing Sheets

(56) References Cited

U.S. PATENT DOCUMENTS

| | | | |
|---|---|---|---|
| 2014/0107919 A1* | 4/2014 | Venkatraman | G01C 21/20 |
| | | | 701/466 |
| 2016/0191913 A1* | 6/2016 | Martch | H04N 21/2402 |
| | | | 348/189 |
| 2016/0198152 A1 | 7/2016 | Chin et al. | |
| 2018/0041985 A1* | 2/2018 | Davaadorj | G01S 5/0289 |
| 2018/0241759 A1* | 8/2018 | Solow | H04L 63/107 |

* cited by examiner

GEOLOCATION OF SET-TOP BOXES USING MACHINE LEARNING

BACKGROUND

Technical Field

The present disclosure is directed to determining geographical locations of set-top boxes, and modifying behavior of set-top boxes based on the geographical locations of the set-top boxes.

Description of the Related Art

Set-top boxes are used to receive content from a content provider and display the content on a display device for a user. Content providers often enforce different types of restrictions on the content depending on where a user is using the content provider's service. For example, a content provider may restrict a set-top box located Colorado from displaying news programs outside of Colorado. For a content provider to enforce such geographical restrictions, it is important for the content provider to reliably determine a geographical location of a set-top box.

There are a variety of ways for a content provider to determine a geographical location of a set-top box. A set-top box, for example, may include specialized equipment, such as a global positioning system (GPS), to determine geographical location. A content provider may also determine geographical location based on the signals transmitted from a set-top box. For instance, a set-top box may include a network interface or landline for transmitting signals to a content provider, and the content provider may determine a geographical location of the set-top box based on an Internet Protocol (IP) address or an area code of the set-top box.

Unfortunately, a geographical location of a set-top box may not always be determined using such methods. Many set-top boxes are not properly equipped with specialized hardware to determine geographical location, or are unable to transmit signals to the content provider. For example, many set-top boxes do not include a GPS, a network interface, or a landline. Further, even if a set-top box is equipped with the proper hardware to determine geographical location, a user may not have their set-top box set up properly. For instance, a user may have his or her set-top box unplugged and disconnected from the Internet.

When a content provider is unable to reliably determine a geographical location of a set-top box, a content provider is typically forced to rely on information provided by the user. For example, a content provider may have to rely on a user contacting the content provider and providing his or her geographical location, or a content provider may have to assume that a geographical location of a set-top box is the same as the user's billing address. Unfortunately, relying on the user is also often unreliable. For instance, a user may be unwilling to provide their geographical location to the content provider, or a user may have moved locations without notifying the content provider.

BRIEF SUMMARY

The present disclosure is directed to a system and methods for generating geographical models, determining geographical locations of set-top boxes using the geographical models, and modifying behavior of set-top boxes based on their geographical locations.

In accordance with one or more embodiments, a content provider generates a plurality of geographical models corresponding to a plurality of geographical areas. The content provider transmits the geographical models, along with geographical rules, to a plurality of set-top boxes. Each of the set-top boxes use the geographical models to determine its geographical location, and use the geographical rules to modify its behavior based on its geographical location. By using the geographical models, each of the set-top boxes are capable of determining its own geographical location, regardless of whether the set-top box includes specialized equipment for determining geographical location, or is able to transmit signals to a content provider.

According to one embodiment, a set-top box includes a set-top box controller, an input interface, an output interface, a peripheral interface, a signal reader, set-top box geographical model storage, and set-top box geographical rule storage. The set-top box controller manages the functions of the set-top box by controlling the input interface, the output interface, the peripheral interface, the signal reader, the set-top box geographical models storage, and the set-top box geographical rule storage. The input interface is an interface for receiving signals. The output interface is an interface for outputting signals. The peripheral interface communicates with one or more peripheral devices, such as a remote control, a display device, multimedia player, and speakers. The signal reader measures signal strengths of signals received by the input interface. The set-top box geographical model storage stores a plurality of geographical models that provide a signal profiles for geographical areas. The set-top box geographical rule storage stores a plurality of geographical rules. Each geographical rule provides a behavioral instruction for a set-top box that is dependent on the geographical location of the set-top box.

According to one embodiment, the content provider includes a content provider controller, a data collector, a machine learning engine, content storage, content provider geographical model storage, and content provider geographical rule storage. The content provider controller manages the functions of the content provider by controlling the data collector, the machine learning engine, the content storage, the content provider geographical model storage, and the content provider geographical rule storage. The data collector collects or accumulates signals transmitted by set-top boxes. The machine learning engine generates geographical models corresponding to a plurality of geographical areas. The content storage stores content to be provided to set-top boxes. The content provider geographical model storage, similar to the geographical model storage, stores a plurality of geographical models. The content provider geographical rule storage, similar to the set-top box geographical rule storage, stores a plurality of geographical rules.

According to one embodiment, the method for generating geographical models includes satellites broadcasting downlink signals from a content provider to set-top boxes within a target geographical area. Each of the set-top boxes measures signal strengths of received downlink signals and transmit the signal strength measurements to the content provider. The content provider then collects the signal strength measurements from the set-top boxes, and generates a geographical model for the target geographical area using the signal strength measurements. The content provider then determines whether there is an additional geographical area that needs a geographical model. If an additional geographical area needs a geographical model, the method is repeated. If an additional geographical area needs a geographical model, the method ends.

According to one embodiment, the method for determining a geographical location of set-top boxes and modifying behavior of set-top boxes based on geographical location includes a content provider transmitting geographical models and geographical rules to set-top boxes. Each of the set-top boxes receives and stores the geographical models and the geographical rules. In one embodiment, the geographical models and the geographical rules are stored in the set-top box as part of the manufacturing process. Each of the set-top boxes then receives downlink signals from the content provider via satellites and measures signal strengths of received downlink signals. Each of the set-top boxes then determines its geographical location based on the geographical models and the measured signal strengths. The set-top boxes are able to determine their geographical location without any assistance from the content provider. Based on the determined geographical location and the geographical rules, each of the set-top boxes then modifies its behavior. The content provider then determines whether any of the geographical models and/or geographical rules has been updated. If any of the geographical models and/or geographical rules has been updated, the method is repeated.

DETAILED DESCRIPTION

In the following description, certain specific details are set forth in order to provide a thorough understanding of various embodiments of the disclosure. However, one skilled in the art will understand that the disclosure may be practiced without these specific details. In some instances, well-known details associated with set-top boxes and satellite service providers have not been described to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Figure 1:
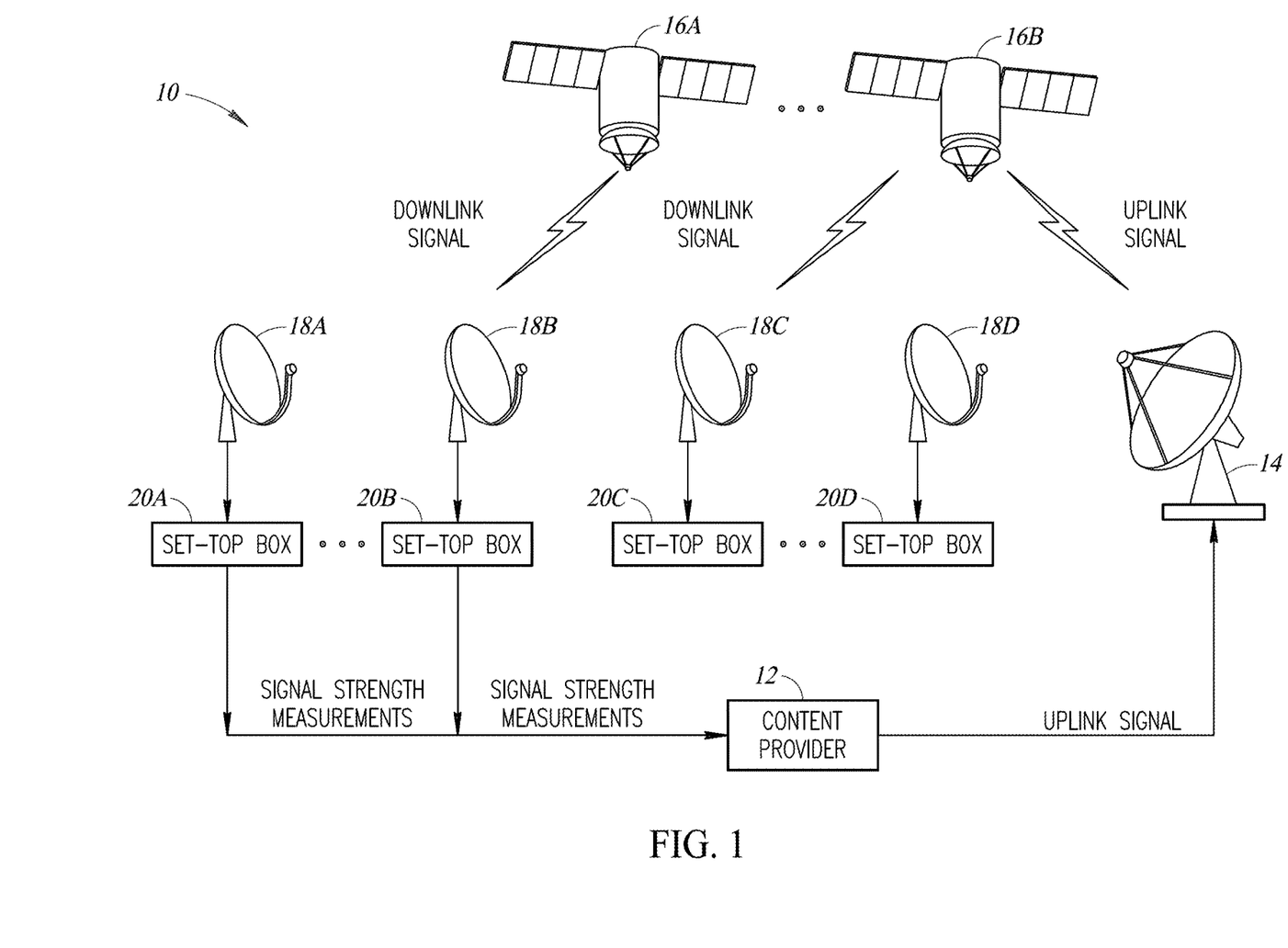
FIG. 1 shows a block diagram of a service provider system, according to one embodiment disclosed herein.

FIG. 1 shows a block diagram of a service provider system 10, according to one embodiment disclosed herein.

The service provider system 10 includes a content provider 12, a transmitting antenna 14, satellites 16A and 16B, receiving antennas 18A, 18B, 18C, and 18D, and set-top boxes 20A, 20B, 20C, and 20D. Although only a single transmitting antenna (transmitting antenna 14), two satellites (satellites 16A and 16B), four receiving antennas (receiving antennas 18A, 18B, 18C, and 18D), and four set-top boxes (set-top boxes 20A, 20B, 20C, and 20D) are shown in FIG. 1, there may be any number of transmitting antennas, satellites, receiving antennas, and set-top boxes.

The content provider 12 is a service provider that provides content to a plurality of users. Content may be in the form of video, audio, data, multimedia, or any other form appropriate for transmission to the set-top boxes 20A, 20B, 20C, and 20D. The content provider 12 may provide content to users through any type of wired or wireless communication system, such as satellite, antenna, cable, and servicers, in their associated network topologies. Components of the content provider 12 will be discussed in further detail with respect to FIG. 3.

In one embodiment, as shown in FIG. 1, the content provider 12 is a direct broadcast satellite service provider that transmits content over a satellite communication network that includes the transmitting antenna 14, the satellites 16A and 16B, and the receiving antennas 18A, 18B, 18C, and 18D. The content provider 12 transmits an uplink signal including content to the transmitting antenna 14, which in turn transmits the uplink signal to the satellites 16A and 16B. The satellites 16A and 16B then provide the uplink signal to the receiving antennas 18A, 18B, 18C, and 18D by transmitting downlink signals. The receiving antennas 18A, 18B, 18C, and 18D then provide the downlink signals to the set-top boxes 20A, 20B, 20C, and 20D, respectively.

In one embodiment, each of the set-top boxes 20A, 20B, 20C, and 20D receives and processes multiple downlink signals from multiple satellites. For example, the set-top box 20A may receive and process a first downlink signal from satellite 16A and a second downlink signal from satellite 16B.

In one embodiment, each of the set-top boxes 20A, 20B, 20C, and 20D receives and processes a single downlink signal of content from a single satellite. For example, the set-top box 20A may receive and process a downlink signal from satellite 16A, but not from satellite 16B.

The set-top boxes 20A, 20B, 20C, and 20D are electronic devices that acquire, process, and display content transmitted by the content provider 12. Namely, each of the set-top boxes 20A, 20B, 20C, and 20D receive content from the content provider 12 and output the content to a display device. The display device may be any electronic device that presents content to a user, such as a television, a computer, a laptop, a tablet, and a smart phone. Components of each of the set-top boxes 20A, 20B, 20C, and 20D will be discussed in further detail with respect to FIG. 3.

The set-top boxes 20A and 20B transmit signals to the content provider 12, and have known geographical locations. As will be discussed in further detail with respect to FIG. 4, the set-top boxes 20A and 20B transmit signal strength measurements to the content provider 12 and are used for generating geographical models.

The geographical locations of the set-top boxes 20A and 20B may be determined using a variety of methods. In one embodiment, the geographical locations of the set-top boxes 20a and 20B are determined using the method described with respect to FIG. 4. In one embodiment, each of the set-top boxes 20A and 20B is equipped with specialized equipment for determining geographical location, such as GPS. In one embodiment, each of the set-top boxes 20A and 20B includes a network interface, and a geographical location is determined based on an Internet Protocol (IP) address. In one embodiment, each of the set-top boxes 20A and 20B includes a landline, and a geographical location is determined based on a telephone number area code. In one embodiment, the geographical locations of the set-top boxes 20A and 20B are determined using information provided by users of the set-top boxes 20A and 20B, such as billing address, zip code, data provided by the installer when the dish is installed, or by some other method.

Although only two set-top boxes (set-top boxes 20A and 20B) that have a known geographical location are shown in FIG. 1, there may be any number of set-top boxes that have known geographical locations and are configured to transmit signals to the content provider 12.

The set-top boxes 20C and 20D are unable to transmit signals to the content provider 12. As a result, the content provider 12 is unable to determine the geographical locations of the set-top boxes 20C and 20D based on signals received from the set-top boxes 20C and 20D. In one embodiment, the set-top boxes 20C and 20D do not include a network interface, and, thus, the content provider 12 cannot determine the geographical locations of the set-top boxes 20C and 20D based on their respective IP addresses. In one embodiment, the set-top boxes 20C and 20D do not include a landline interface, and, thus, the content provider 12 cannot determine the geographical locations of the set-top boxes 20C and 20D based on their respective telephone area codes. In some instances, the set-top boxes 20C and 20D may be connected to a cell phone. However, the telephone area codes for cell phones are typically not reliable as a set-top box is frequently not in the same physical location as its corresponding cell phone. For example, a user frequently obtains a cell phone in a first state and then continues to use that cell phone number, even though the user may move multiple times to many different states. In one embodiment, the set-top boxes 20C and 20D are not properly connected to transmit signals (e.g., a user may have his or her set-top box unplugged and disconnected), and, thus, the content provider 12 cannot determine the geographical locations of the set-top boxes 20C and 20D based on their respective IP addresses or area codes.

In addition, the set-top boxes 20C and 20D do not include specialized equipment for determining their geographical location on their own. For example, the set-top boxes 20C and 20D may not include a GPS.

As previously discussed, the user may provide information, such as an address to which the bill is sent to the content provider 12; however, such information is not always reliable. For example, a billing address may be a post office box or business location and might not be representative of the zip code in with the set-top box is physically sitting during which it is receiving transmissions.

Although only two set-top boxes (set-top boxes 20C and 20D) whose location is not known are shown in FIG. 1, there may be any number of set-top boxes that have unknown geographical locations.

As will be discussed in further detail with respect to FIG. 5, each of the set-top boxes 20A, 20B, 20C, and 20D are configured to determine its own geographical location and modify its own behavior, without intervention from the content provider 12, based on the determined geographical location. For example, the set-top box 20C may determine that it is located in Denver, Colo., and provide programming (e.g., radio stations, television channels, movies, sporting events, new programs, or advertisements) that is local to Denver, Colo.

As previously discussed, knowing the geographical location of a set-top box is quite important for correct operation and programming. Frequently, basic news networks, such as ABC, CBS, and NBC, as well as a number of local stations, will broadcast over the air to multiple different geographical locations. However, a person having a set-top box located in a particular location should receive programming specific for the particular location, and should not receive programming specific to other geographical locations. For example, set-top boxes located in Denver, Colo., for example, should receive all local Denver, Colo., broadcast stations. Each of these local stations has programming unique to that location, such as the local news for Denver, Colo., sporting events, advertisements, and other programming which is unique to Denver, Colo. Accordingly, in order to properly display the correct programming on each set-top box, the system must know the geographical location of the set-top box.

As can be appreciated, the uplink signal transmitted from the content provider 12 to the various satellites 16A and 16B includes the local channel for multiple markets. For example, the uplink signal to the satellite 16B over the state of Colorado will include all the signals for the local stations in many Colorado locations, such as Colorado Springs, Colo.; Boulder, Colo.; Denver, Colo.; as well as numerous towns throughout the state of Colorado. The satellite 16B will transmit to a particular set-top box, such as set-top box 20C, a downlink signal that includes the local programming for each of the cities in the entire state of Colorado. However, based on agreements with the local networks, the set-top box 20C should only display those channels for the geographical area in which it is positioned. For example, a set-top box that is outputting a signal for viewing by a user in Denver, Colo., should not output the local stations for Colorado Springs, Colo.; Boulder, Colo.; much less for even more distant locations, such as Cheyanne, Wyo.; or Salt Lake City, Utah. Accordingly, somewhere in the system there must be an indication to the set-top box as to its current geographical location so that it can output the correct content, such as video programs and televisions channels, to the user and also block the output of content that are not part of the local geographical area in which it is positioned.

Figure 2:
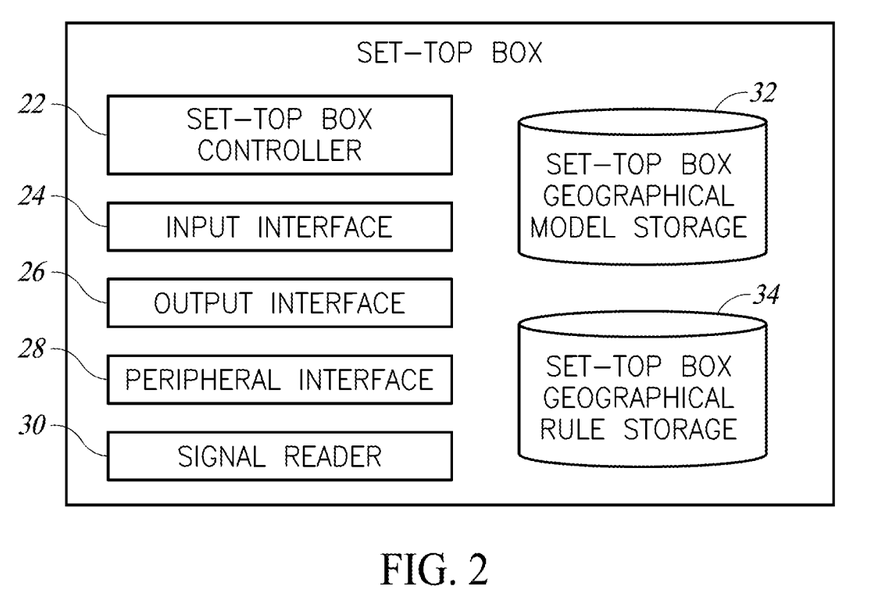
FIG. 2 shows a block diagram of a set-top box, according to one embodiment disclosed herein.

FIG. 2 shows a block diagram of a set-top box, such as set-top boxes 20A, 20B, 20C, and/or 20D, according to one embodiment disclosed herein. The set-top box shown in FIG. 2 includes a set-top box controller 22, an input interface 24, an output interface 26, a peripheral interface 28, a signal reader 30, set-top box geographical model storage 32, and set-top box geographical rule storage 34.

The set-top box controller 22 manages the functions of the set-top box by controlling the input interface 24, the output interface 26, the peripheral interface 28, the signal reader 30, the set-top box geographical models storage 32, and the set-top box geographical rule storage 34. In one embodiment, as will be discussed in further detail with respect to FIG. 5, the set-top box controller 22 performs a method for determining a geographical location of the set-top box and modifying behavior of the set-top box based on the determined geographical location using the input interface 24, the output interface 26, the signal reader 30, the set-top box geographical models storage 32, and the set-top box geographical rule storage 34.

The input interface 24 is an interface for receiving signals. In one embodiment, the input interface 24 receives content from the content provider 12 via the transmitting antenna 14, at least one of the satellites 16A and 16B, and one of the receiving antennas 18A, 18B, 18C, and 18D. The input interface 24 may include one or more different types of inputs for receiving signals. For example, the input interface 24 may include one or more of a tuner, a network input, a landline input, or any other type of input capable of receiving signals.

The output interface 26 is an interface for outputting signals. In one embodiment, the output interface transmits signals to the content provider 12. The output interface 26 may include one or more different types of outputs for outputting signals. For example, the output interface 26 may include one or more of a network output, a landline output, or any other type of output capable of transmitting signals.

The peripheral interface 28 communicates with one or more peripheral devices, such as a remote control, a display device (e.g., a television), multimedia player (e.g., a DVD player, a VCR, etc.), and speakers. For example, the peripheral interface 28 may receive commands from a remote control, provide multimedia content to a display device, receive multimedia content from a multimedia player, and provide audio signals to speakers.

The signal reader 30 measures signal strengths of signals received by the input interface 24. The signal reader 30 may be any type of hardware or circuit capable of measuring signal strength. As will be discussed in further detail with respect to FIG. 4, in one embodiment, the signal reader 30 measures signal strengths of downlink signals transmitted by at least one satellite, such as the satellites 16A and 16B, and received at a corresponding receiving antenna and then transmitted to the set-top box, where it is received by the input interface 24.

The set-top box geographical model storage 32 stores a plurality of geographical models. Each geographical model provides a signal profile for a particular geographical area. A geographical model includes expected signal strengths of signals that are transmitted by one or more satellites and received by a set-top box in a particular geographical area. For example, a geographical model corresponding to Denver, Colo., may provide that a set-top box located in Denver, Colo., should receive a signal from satellite 16A that is between −35 decibels (dB) to −45 dB, and receive a signal from satellite 16B that is between −25 dB and −35 dB.

In one embodiment, the geographical model storage 32 includes a geographical model for each state of the United States. In one embodiment, the set-top box geographical model storage 32 includes a geographical model for a plurality of areas (e.g., cities, counties, etc.) within a single state.

The generating or creation of the geographical models will be discussed in further detail with respect to FIG. 4.

The set-top box geographical rule storage 34 stores a plurality of geographical rules. Each geographical rule provides a behavioral instruction for a set-top box that is dependent on the geographical location of the set-top box.

In one embodiment, a geographical rule restricts a set-top box located in a particular geographical location (e.g., Denver, Colo.) from providing specific content to a user (e.g., a news program that is not local to the particular geographical location, a sporting event of a team that is not local to the particular geographical area, etc.). In one embodiment, a geographical rule restricts a set-top box located in a particular geographical location from providing any content to a user. In one embodiment, a geographical rule instructs a set-top box located in a particular geographical location to provide additional content to a user (e.g., a local news program, a local sporting event, etc.). In one embodiment, a geographical rule instructs a set-top box located in a particular geographical location to provide a notification to a user.

In one embodiment, the set-top box geographical rule storage 34 includes at least one geographical rule for each state of the United States. In one embodiment, the set-top box geographical rule storage 34 includes geographical rules for a plurality of area (e.g., cities, counties, etc.) within a single state.

The use of the geographical rules will be discussed in further detail with respect to FIG. 5.

Figure 3:
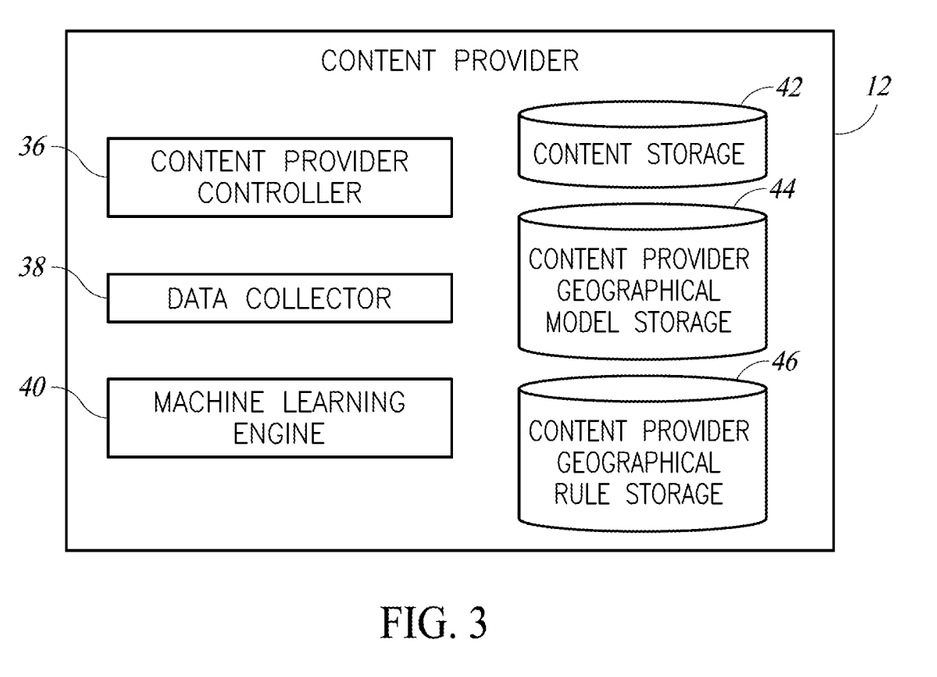
FIG. 3 shows a block diagram of a content provider, according to one embodiment disclosed herein.

FIG. 3 shows a block diagram of the content provider 12, according to one embodiment disclosed herein. The content provider 12 includes a content provider controller 36, a data collector 38, a machine learning engine 40, content storage 42, content provider geographical model storage 44, and content provider geographical rule storage 46. Although the content provider 12 is shown in FIG. 3 as a single element, the content provider 12 may be composed of a plurality of elements. In one embodiment, the content provider 12 is a distributed system and the content provider controller 36, the data collector 38, the machine learning engine 40, the content storage 42, the content provider geographical model storage 44, and the content provider geographical rule storage 46 are spread over multiple devices.

The content provider controller 36 manages the functions of the content provider 12 by controlling the data collector 38, the machine learning engine 40, the content storage 42, the content provider geographical model storage 44, and the content provider geographical rule storage 46. In one embodiment, as will be discussed in further detail with respect to FIG. 4, the content provider controller 36 performs a method for generating geographical models using the data collector 38, the machine learning engine 40, the content provider geographical model storage 44, and the content provider geographical rule storage 46.

The data collector 38 collects or accumulates signals transmitted by set-top boxes. In one embodiment, the data collector 38 collects signal strength measurements that are transmitted by set-top boxes. For example, referring to FIG. 1, the data collector 38 collects signal strength measurements transmitted by the set-top boxes 20A and 20B. As will be discussed with respect to FIG. 4, the collected signal strength measurements are used to generate geographical models.

The machine learning engine 40 generates geographical models corresponding to a plurality of geographical areas. As previously discussed, each geographical model includes expected signal strengths of signals that are received by a set-top box in a particular geographical area. As will be discussed with respect to FIG. 4, the machine learning engine 40 generates geographical models using signal strength measurements collected by the data collector 38.

The content storage 42 stores content to be provided to set-top boxes. As discussed with respect to FIG. 1, the content provider 12 provides content stored in the content storage 42 to the set-top boxes 20A, 20B, 20C, and 20D through the transmitting antenna 14, the satellites 16A and 16B, and the receiving antennas 18A, 18B, 18C, and 18D. As previously discussed, content may be in the form of video, audio, data, multimedia, or any other form appropriate for transmission to set-top boxes.

The content provider geographical model storage 44, similar to the geographical model storage 32, stores a plurality of geographical models. As previously discussed, each geographical model includes expected signal strengths of signals that are received by a set-top box in a particular geographical area. The generating or creation of the geographical models will be discussed in further detail with respect to FIG. 4.

The content provider geographical rule storage 46, similar to the set-top box geographical rule storage 34, stores a plurality of geographical rules. As previously discussed, each geographical rule provides a behavioral instruction for a set-top box that is dependent on the geographical location of the set-top box.

Figure 4:
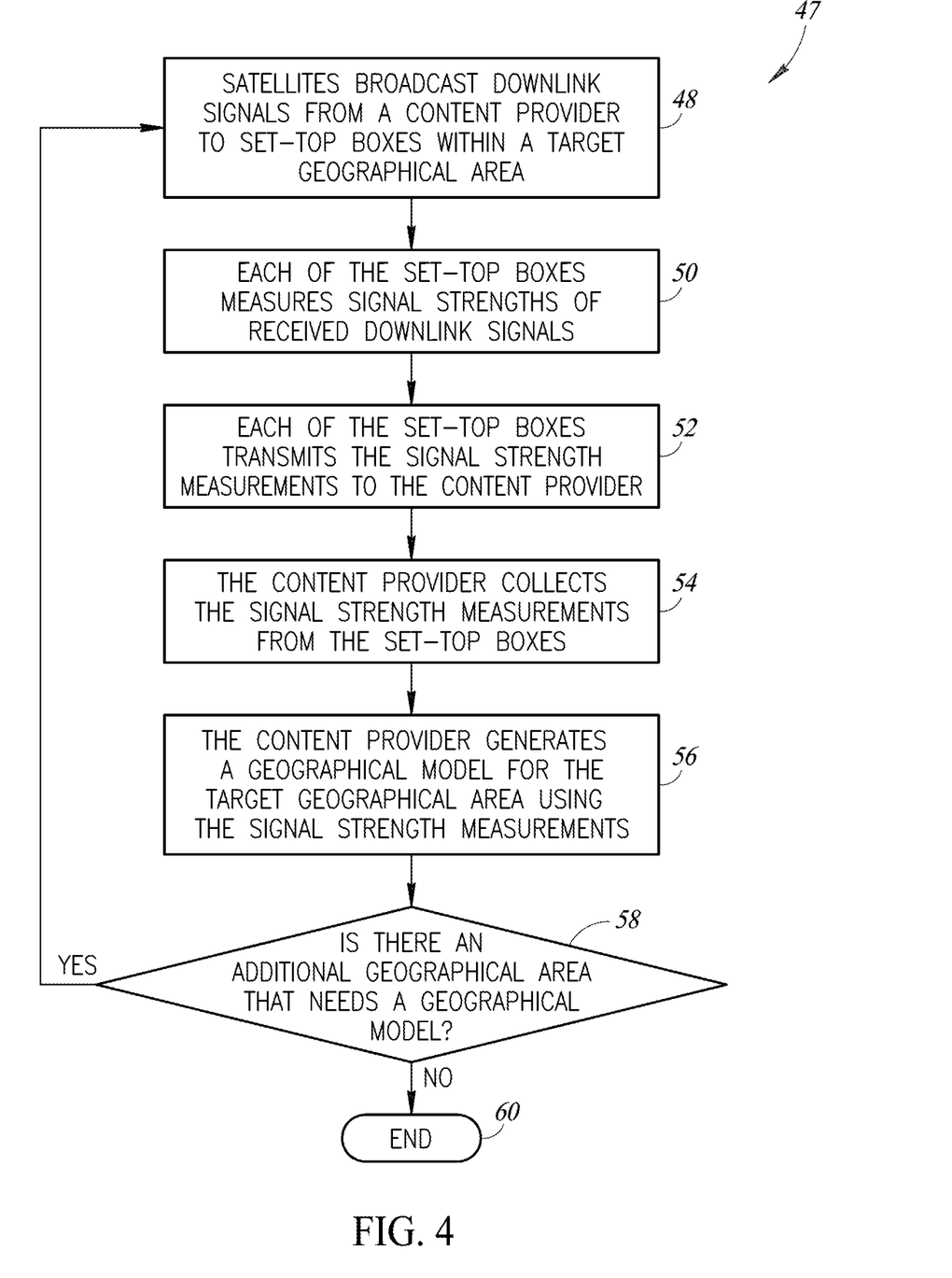
FIG. 4 shows a flow diagram of a method for generating geographical models, according to one embodiment disclosed herein.

FIG. 4 shows a flow diagram of a method 47 for generating geographical models, according to one embodiment disclosed herein.

In step 48, satellites broadcast downlink signals from a content provider to set-top boxes within a target geographical area. With respect to FIG. 1, for example, if the target geographical area is Denver, Colo., and the set-top boxes 20A and 20B are within Denver, Colo., the satellites 16A and 16B broadcast downlink signals from the content provider 12 to the set-top boxes 20A and 20B.

Although only satellites 16A and 16B are shown in FIG. 1, any number of satellites may broadcast downlink signals from the content provider 12 to the set-top boxes 20A and 20B.

As previously discussed, the satellites 16A and 16B receive an uplink signal from the content provider 12 through the transmitting antenna 14; and the set-top boxes 20A and 20B receive, at their respective input interfaces 24, the downlink signals through the receiving antennas 18A and 18B, respectively.

In one embodiment, the downlink signals broadcasted by the satellites include multimedia content. In another embodiment, the downlink signal transmitted by the satellites includes a programming schedule (i.e., schedule of when television programs are aired) for multimedia content.

In step 50, each of the set-top boxes measures signal strengths of received downlink signals. In one embodiment, the set-top boxes that measure signal strengths of received downlink signals are capable of transmitting signals to the content provider 12. With respect to FIG. 1, for example, each of the set-top boxes 20A and 20B measures signal strengths of received downlink signals using their respective signal readers 30.

Although only set-top boxes 20A and 20B are shown in FIG. 1 as having a known geographical location which the content provider 12 can rely upon as accurate, there may be any number of set-top boxes that are capable of transmitting signals to the content provider 12 which are known to be accurate.

As previously discussed, in one embodiment, each of the set-top boxes 20A, 20B, 20C, and 20D receives and processes multiple downlink signals from multiple satellites. For example, the set-top box 20A may receive and process a first downlink signal from satellite 16A and a second downlink signal from satellite 16B. In this case, the set-top box 20A will measure signal strengths of received downlink signals from both satellites 16A and 16B.

In another embodiment, as previously discussed, each of the set-top boxes 20A, 20B, 20C, and 20D receives and processes a single downlink signal of content from a single satellite. For example, the set-top box 20A may receive and process a downlink signal from satellite 16A, but not from satellite 16B; and the set-top box 20B may receive and process a downlink signal from satellite 16B, but not from satellite 16A. In this case, the set-top box 20A will measure the signal strength of the downlink signal received from satellite 16A, and the set-top box 20B will measure the signal strength of the downlink signal received from satellite 16B.

Frequently, a set-top box will receive signals from multiple satellites. In one embodiment, there are up to fifteen satellites which are receiving an uplink signal from the content provider 12. Each of the satellites is positioned at a different physical location in space and have their antennas directed towards a different location on Earth. As will be appreciated with fifteen satellites, each of the satellites will have a different signal strength at any particular physical location on Earth. For example, the set-top box 20A may receive an extremely strong signal from the first satellite, a moderate signal from the second satellite, a weak signal from the third satellite, no signals from the fourth and fifth satellites, moderate signals from the sixth and seventh satellites, and no signals from the eighth through fifteenth satellites. Accordingly, the set-top box 20A will have a particular strength signature from each of the fifteen different satellites. Based on the signal strength from each of these different fifteen satellites, the physical location of the set-top box 20A can be quite precisely known using triangulation techniques or other techniques that are known in the art.

In step 52, one or more of the set-top boxes transmits the signal strength measurements to the content provider. With respect to FIG. 1, for example, each of the set-top boxes 20A and 20B transmits the signal strength measurements to the content provider 12 through their respective output interfaces 26.

In step 54, the content provider collects the signal strength measurements from the set-top boxes. With respect to FIG. 1, for example, the content provider 12 collects the signal strength measurements from the set-top boxes 20A and 20B using the data collector 38.

In step 56, the content provider generates a geographical model for the target geographical area using the signal strength measurements. As previously discussed, a geographical model provides a signal profile for a particular geographical area. The geographical model includes expected signal strengths of signals that are transmitted by a satellite and received by a set-top box in a particular geographical area. With respect to FIG. 1, for example, as the set-top boxes 20A and 20B are both within Denver, Colo., the content provider 12 generates a geographical model for Denver, Colo., by storing the signal strength measurements collected in step 54 in the geographical model.

In one embodiment, the content provider 12 calculates a signal strength range of the signal strength measurements collected in step 54 for each satellite, and stores the calculated signal strength range in the geographical model. In one embodiment, the content provider 12 calculates signal strength average of the signal strength measurements collected in step 54 for each satellite, and stores the calculated signal strength average in the geographical model.

Table 1 below provides an example of a geographical model for Denver, Colo., in the case that each of the set-top boxes 20A and 20B receives downlink signals from satellites 16A and 16B.

TABLE 1

Example of geographical model for Denver, Colorado.

| Satellite | Set-top box 20A | Set-top box 20B | Signal strength range | Signal strength average |
|---|---|---|---|---|
| Satellite 16A | −35 dB | −45 dB | −35 dB to −45 dB | −40 dB |
| Satellite 16B | −25 dB | −35 dB | −25 dB to −35 dB | −30 dB |

As shown in Table 1, set-top box 20A received a signal from satellite 16A that is approximately −35 dB and a signal from satellite 16B that is approximately −25 dB, and set-top box 20B received a signal from satellite 16A that is approximately −45 dB and a signal from satellite 16B that is approximately −35 dB. Based on the signal strength measurements, the content provider 12 determines that a set-top box in located in Denver, Colo., should receive a signal from satellite 16A that is between −35 dB to −45 dB or within a predetermined threshold of −40 dB, and should receive a signal from satellite 16B that is between −25 dB to −35 dB or within a predetermined threshold of −30 dB.

Although it is not included in the geographical model shown in Table 1, the fact that a set-top box has received no signals from one or more satellites is also important data. As previously discussed, in practice, a set-top box will generally receive signals from multiple satellites, sometimes up to five satellites. As the content provider 12 is generally aware of the total available satellites in space (e.g., fifteen satellites), the satellites from which a set-top box is not receiving any signal at all is an important data point for assisting to determine the geographical location of a set-top box. Using the signal strength for the various satellites, including zero signal strengths, the geographical location for the set-top box can, therefore, be determined with a high degree of accuracy.

In one embodiment, a confirmation reference set-top box is provided in which the physical location of the set-top box is known to the content provider 12 based on it being placed there by its engineering staff and the zip code being exactly recorded. The reference set-top box may then collect signal strength data from a plurality of satellites and create a signature for the signal reception strength for a set-top box located within that particular zip code. Other techniques may also be used. For example, the content provider 12 knows generally where each of the satellites is pointed. It knows, for example, that satellite 16A is pointed to Denver, Colo., and satellite 16B is pointed at Philadelphia, Pa. Accordingly, using the information of where satellites 16 are pointed and collecting signal strength data from each of the set-top boxes a determination can also be made as to the expected physical location of each particular set-top box.

In one embodiment, the generated geographical models are stored in the content provider geographical model storage 44. As will be discussed in further detail with respect to FIG. 5, the geographical models are used by a set-top box to determine its own geographical location.

In step 58, it is determined whether there is an additional geographical area that needs a geographical model. With respect to FIG. 1, for example, the content provider 12 determines whether there is an additional geographical area, in addition to the target geographical area, that needs a geographical model. If it is determined that there is an additional geographical area that needs a geographical model, the process returns to step 48. For example, if it is determined that another city in Colorado needs a geographical model, the process returns to step 48. If it is determined that there is not an additional geographical area that needs a geographical model, the process proceeds to step 60 and ends.

Figure 5:
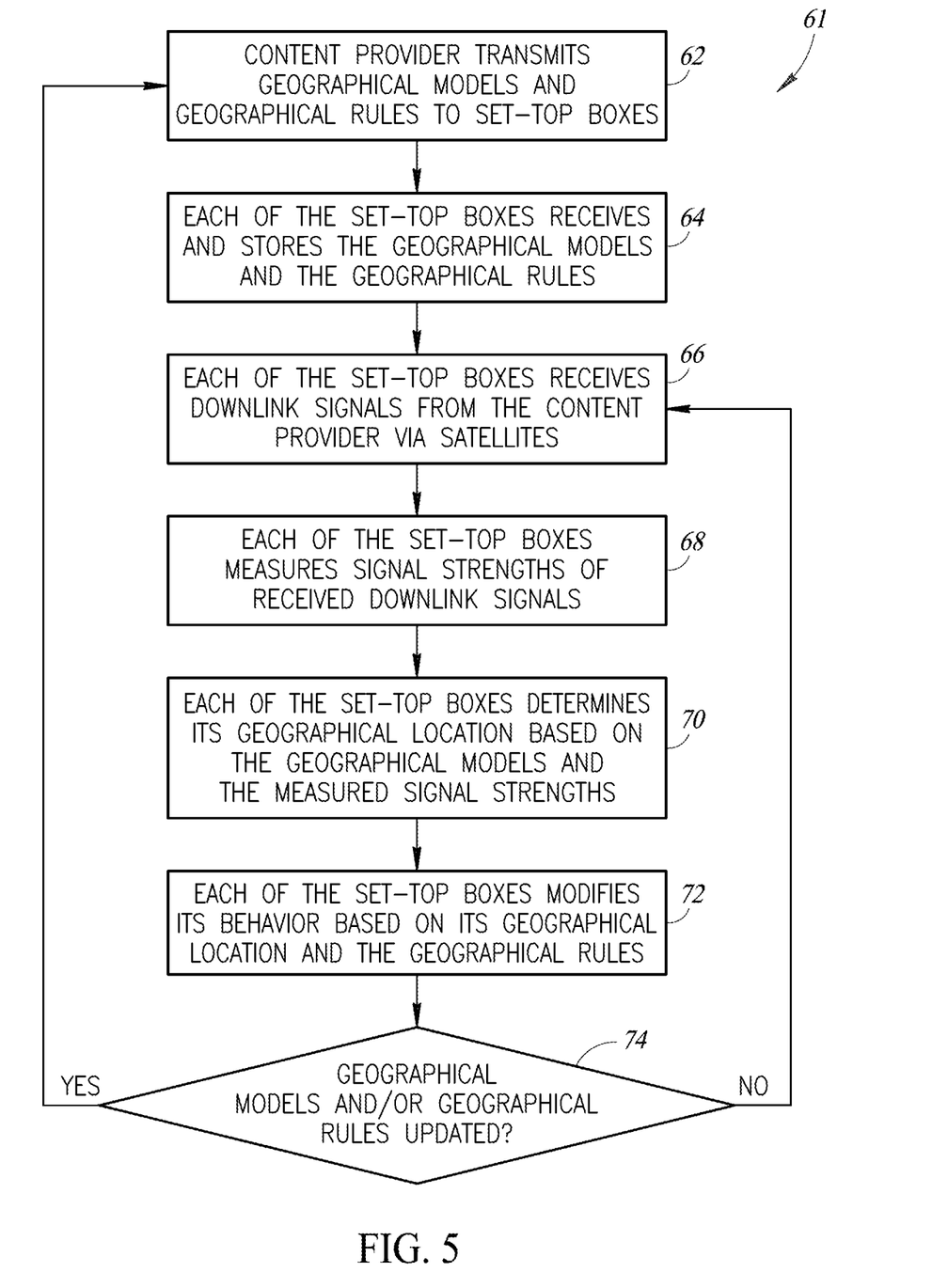
FIG. 5 shows a flow diagram of a method for determining a geographical location of set-top boxes and modifying behavior of set-top boxes based on geographical location, according to one embodiment disclosed herein.

FIG. 5 shows a flow diagram of a method 61 for determining a geographical location of set-top boxes and modifying behavior of set-top boxes based on geographical location, according to one embodiment disclosed herein.

In step 62, a content provider transmits geographical models and geographical rules to set-top boxes. In one embodiment, the content provider transmits geographical models and geographical rules to set-top boxes that are unable to transmit signals to the content provider and that do not include specialized equipment for determining geographical location (e.g., GPS). With respect to FIG. 1, for example, the content provider 12 transmits geographical models and geographical rules to the set-top boxes 20C and 20D.

In one embodiment, the content provider transmits geographical models and geographical rules that are stored in the content provider geographical model storage 44 and the content provider geographical rule storage 46, respectively. In one embodiment, the content provider 12 transmits geographical models that were generated using the method 47 discussed with respect to FIG. 4.

In one embodiment, the content provider 12 transmits geographical models for each state of the United States. In one embodiment, the content provider 12 transmits geographical models for a plurality of areas (e.g., cities, counties, etc.) within a single state.

Although only set-top boxes 20C and 20D are shown in FIG. 1 as not transmitting data to the content provider, the content provider 12 may transmit geographical models and geographical rules to any number of set-top boxes that are unable to transmit signals to the content provider and that do not include specialized equipment for determining their geographical location on their own.

In step 64, each of the set-top boxes receives and stores the geographical models and the geographical rules. With respect to FIG. 1, for example, each of the set-top boxes 20C and 20D receives and stores the geographical models and the geographical rules.

In one embodiment, the set-top boxes 20C and 20D store the geographical models in their respective set-top box geographical model storage 32. In one embodiment, the set-top boxes 20C and 20D store the geographical rules in their respective set-top box geographical rule storage 34.

In one embodiment, the geographical models have been assembled previously over the prior months and are stored by the content provider 12. The content provider 12 has access to the set-top boxes 20C and 20D at the time it is manufactured, and, at this time, downloads the geographical models into the set-top boxes 20C and 20D to their respective set-top box geographical model storages 32. Similarly, the content provider 12 downloads the geographical rules to the set-top boxes 20C and 20 D to their respective set-top box geographical rule storage 34. In this embodiment, the geographical models and the geographical rules are provided in the set-top boxes 20C and 20D before it is deployed to any particular geographical location.

In step 66, each of the set-top boxes receives downlink signals from the content provider via satellites. With respect to FIG. 1, for example, each of the set-top boxes 20C and 20D receives downlink signals from the content provider 12 via the satellites 16A and 16B.

Although only satellites 16A and 16B are shown in FIG. 1, any number of satellites may broadcast downlink signals from the content provider to the set-top boxes 20C and 20D.

As previously discussed, the satellites 16A and 16B receive an uplink signal from the content provider 12 through the transmitting antenna 14; and the set-top boxes 20A and 20B receive, at their respective input interfaces 24, the downlink signal from the satellites 16A and 16B through the receiving antennas 18A and 18B, respectively.

In one embodiment, the downlink signals received by the set-top boxes include multimedia content. In one embodiment, the downlink signals received by the set-top boxes include a programming schedule (i.e., schedule of when television programs are aired) for multimedia content.

In step 68, each of the set-top boxes measures signal strengths of received downlink signals. With respect to FIG. 1, for example, each of the set-top boxes 20C and 20D measures signal strengths of received downlink signals using their respective signal readers 30.

As previously discussed, in one embodiment, each of the set-top boxes 20A, 20B, 20C, and 20D receives and processes multiple downlink signals from multiple satellites. For example, the set-top box 20C may receive and process a first downlink signal from satellite 16A and a second downlink signal from satellite 16B. In this case, the set-top box 20C will measure signal strengths of received downlink signals from both satellites 16A and 16B.

In another embodiment, as previously discussed, each of the set-top boxes 20A, 20B, 20C, and 20D receives and processes a single downlink signal of content from a single satellite. For example, the set-top box 20C may receive and process a downlink signal from satellite 16A, but not from satellite 16B; and the set-top box 20D may receive and process a downlink signal from satellite 16B, but not from satellite 16A. In this case, the set-top box 20C will measure the signal strength of the downlink signal received from satellite 16A, and the set-top box 16D will measure the signal strength of the downlink signal received from satellite 16B.

In step 70, each of the set-top boxes determines its geographical location based on the geographical models and the measured signal strengths. A set-top box determines its geographical location by comparing the geographical models received and stored in step 64 to the signal strengths measured in step 68. Namely, the set-top box collects, using its own internal instruction set and memory, the signal strength of a number of different satellites in step 68. Then, using its own internal processor, the set-top box determines the relative signal strength of the different satellites, and determines its own geographical location by comparing the signal strengths to the geographical models received and stored in step 64. Accordingly, in this embodiment, the content provider 12 does not provide any specific instructions to the set-top box regarding the set-top boxes geographical location. Rather, the set-top box determines its own geographical location using its own internal processor.

The set-top box 20C, for example, may determine in step 68 that a signal from satellite 16A is approximately −40 dB and a signal from satellite 16B is approximately −30 dB. In step 70, the set-top box 20C compares these signal strength measurements to each of the geographical models that were stored in its set-top box geographical model storage 32 in step 64 to find a geographical model that matches the signal strength measurements. For instance, if the set-top box 20C stored the geographical model for Denver, Colo., as shown in Table 1 in its set-top box geographical model storage 32 in step 64, the set-top box 20C compares the geographical model for Denver, Colo., to the signal strength measurements in step 68.

In one embodiment, a set-top box compares the signal strength measurements in step 68 to the signal strength ranges defined in a geographical model to determine its geographical location. For example, as shown in Table 1, the geographical model for Denver, Colo., states that a set-top box located in Denver, Colo., should receive a signal from satellite 16A that is between −35 dB to −45 dB and receive a signal from satellite 16B that is between −25 dB and −35 dB. As the signal strength measurements in step 68 for set-top box 20C (which is approximately −40 dB for the signal from satellite 16A, and −30 dB for the signal from satellite 16B in this example) are within the signal strength ranges defined for Denver, Colo., the set-top box 20C determines that it is located within Denver, Colo.

In one embodiment, a set-top box compares the signal strength measurements in step 68 to the signal strength averages defined in the geographical model to determine its geographical location. For example, as shown in Table 1, the geographical model for Denver, Colo., states that a set-top box located in Denver, Colo., should receive a signal from satellite 16A that is within a predetermined threshold of −40 dB (e.g., within 1 dB of −40 dB) and receive a signal from satellite 16B that is within a predetermined threshold of −30 dB (e.g., within 1 dB of −30 dB). As the signal strength measurements in step 68 for set-top box 20C (which is approximately −40 dB for the signal from satellite 16A and −30 dB for the signal from satellite 16B in this example) are within the predetermined threshold of the expected signal strength averages for Denver, Colo., the set-top box 20C determines that it is located within Denver, Colo.

In step 72, each of the set-top boxes modifies its behavior based on its geographical location and the geographical rules. With respect to FIG. 1, for example, each of the set-top boxes 20C and 20D modifies its behavior based on its geographical locations determined in step 70 and the geographical rules received and stored in step 64.

As can be appreciated, there are a number of acceptable techniques to apply the geographical rule for each set-top box. In one embodiment, a set-top box sends its determined geographical location to the content provider 12. The content provider 12 then, in response to receiving the geographical location, sends an instruction back to the set-top box indicating which geographical rules are to be applied. In another embodiment, the set-top box has the geographical rules stored in its set-top box geographical rule storage 34, either by receiving a downlink signal from the content provider 12 during a programming time (e.g., step 64 of the method 61) or at the time of manufacture. In this embodiment, the set-top box, itself, determines which geographical rules to apply based on its geographical location. In other words, the content provider 12 does not provide any specific instructions to the set-top box regarding which geographical rules to apply. Rather, the set-top box, using its own internal processor, applies geographical rules using the geographical rules stored in its set-top box geographical rule storage 34.

As previously discussed, each geographical rule provides a behavioral instruction for a set-top box that is dependent on the geographical location of the set-top box.

In one embodiment, a geographical rule restricts a set-top box located in a particular geographical location from providing specific content to a user. For example, if the set-top box 20C determines that it is located in Denver, Colo., the set-top box 20C may restrict a news program or a sporting event that is not local to Denver, Colo., from being provided to a user.

In one embodiment, a geographical rule instructs a set-top box located in a particular geographical location to provide additional content to a user. For instance if the set-top box 20C determines that it is located in Denver, Colo., the set-top box 20C may provide a news program or a sporting event that is local to Denver, Colo., to a user.

In one embodiment, a geographical rule restricts a set-top box located in a particular geographical location from providing any content to a user. For example, if the set-top box 20C determines that it is located outside of the United States, the set-top box 20C may restrict all content from being provided to a user.

In one embodiment, a geographical rule instructs a set-top box located in a particular geographical location to provide a notification to a user. For example, if the set-top box 20C determines that it is located outside of Denver, Colo., the set-top box 20C may notify a user to contact the content provider 12 immediately.

In step 74, it is determined whether any of the geographical models and/or geographical rules has been updated. Namely, the content provider determines whether any of the geographical models and/or geographical rules has been updated since being transmitted to the set-top boxes in step 62. With respect to FIG. 1, for example, the content provider 12 determines whether any of the geographical models stored in the content provider geographical model storage 44 and/or geographical rules stored in the content provider geographical rule storage 46 have been updated since the geographical models and the geographical rules were transmitted to the set-top boxes 20C and 20D in step 62. If it is determined that a geographical model and/or geographical rule has been updated, the process returns to step 62. If it is determined that a geographical model and/or geographical rule has not been updated, the process returns to step 66.

As can be appreciated, since the content provider 12 is transmitting content, such as video signals, to the set-top boxes 20C and 20D, the content provider 12 is able to update the geographical models and/or the geographical rules stored in their respective set-top box geographical model storage 32 and set-top box geographical rule storage 34 on a regular basis (e.g., periodically or continuously).

In accordance with one or more embodiments, each of the set-top boxes 20A, 20B, 20C, and 20D may reliably determine its geographical location, regardless of whether it is capable of transmitting data to the content provider 12 or it includes specialized equipment for determining its geographical location. As a result, each of the set-top boxes 20A, 20B, 20C, and 20D may modify its own behavior based on its geographical location and enforce geographical restrictions provided by the content provider 12.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a content provider, wherein the content provider is a single device, and wherein the content provider is an only device that provides content in the system;
a first set-top box located at a first site within a first geographical area, the first set-top box configured to receive a first plurality of signals from the content provider, and measure signal strengths of the first plurality of signals, the first plurality of signals being received from among multiple satellites;
a second set-top box located at a second site within the first geographical area, the second set-top box configured to receive a second plurality of signals from the content provider, and measure signal strengths of the second plurality of signals, the second plurality of signals being received from among the multiple satellites;
the content provider configured to receive the measured signal strengths of the first plurality of signals from the first set-top box, receive the measured signal strengths of the second plurality of signals from the second set-top box, and generate a first geographical model for the first geographical area based on the measured signal strengths of the first plurality of signals and the measured signal strengths of the second plurality of signals using machine learning, the first geographical model including expected signal strengths for the first geographical area, and wherein the content provider is the only device that creates a first geographical model in the system; and
a third set-top box configured to receive a third plurality of signals and the first geographical model from the content provider, measure signal strengths of the third plurality of signals, compare the measured signal strengths of the third plurality of signals to the expected signal strengths for the first geographical area, and determine whether or not the third set-top box is within the first geographical area based on the comparison of the measured signal strengths of the third plurality of signals to the expected signal strengths for the first geographical model, the third plurality of signals being received from among the multiple satellites,
wherein the expected signal strength measurements include average signal strength measurements, threshold signal strength measurements, and no signal, wherein various expected signal strengths are associated with separate satellites among the multiple satellites.

2. The system of claim 1 wherein the third set-top box is configured to receive geographical rules from the content provider, and modify a behavior of the third set-top box based on the geographical rules.

3. The system of claim 2 wherein the modification of the behavior of the third set-top box includes content being restricted from being displayed to a user or a notification being displayed to the user.

4. The system of claim 1 wherein the third set-top box is located at a third site spaced apart from the first site and the second site.

5. The system of claim 1 wherein an expected signal strength measurement of no signal represents a satellite among the multiple satellites that is beyond reception distance from a set top box.

6. The system of claim 1, further comprising:
a fourth set-top box configured to receive a fourth plurality of signals from the content provider, measure signal strengths of the fourth plurality of signals, the fourth set-top box located at a third site within a second geographical area that is different from the first geographical area,
the content provider being further configured to receive the measured signal strengths of the fourth plurality of signals from the fourth set-top box, and generate a second geographical model for the second geographical area based on the measured signal strengths of the fourth plurality of signals using machine learning, the second geographical model including expected signal strengths for the second geographical area,
the third set-top box being further configured to receive the second geographical model from the content provider, compare the measured signal strengths of the third plurality of signals to the expected signal strengths for the second geographical area, and determine which of the first geographical area and the second geographical area the third set-top box is located within based on the comparison of the measured signal strengths of the third plurality of signals to the expected signal strengths for the second geographical model and on the comparison of the measured signal strengths of the third plurality of signals to the expected signal strengths for the first geographical model.

7. The system of claim 6 wherein the third set-top box determines that the third set-top box is within the first geographical area if the measured signal strengths of the third plurality of signals is closer in strength to the measured signal strengths of the first plurality of signals than the measured signal strengths of the fourth plurality of signals.

8. A system, comprising:
a content provider, wherein the content provider is a single device, and wherein the content provider is an only device that provides content in the system;
a first set-top box located within a first geographical area, the first set-top box configured to receive a first plurality of signals from a content provider, and measure signal strengths of the first plurality of signals, the first plurality of signals being received from among multiple satellites,
the content provider configured to receive the measured signal strengths of the first plurality of signals, and create a first geographical model for the first geographical area using the measured signal strengths of the first plurality of signals, the first geographical model including expected signal strengths for the first geographical area, and wherein the content provider is the only device that creates a first geographical model in the system; and
a second set-top box configured to receive a second plurality of signals and the first geographical model from the content provider, measure signal strengths of the second plurality of signals, and determine whether or not the second set-top box is within the first geographical area based on a comparison between the measured signal strengths of the second plurality of signals and the expected signal strengths for the first geographical model, the second plurality of signals being received from among multiple satellites,
wherein the expected signal strength measurements include average signal strength measurements, threshold signal strength measurements, and no signal, wherein various expected signal strengths are associated with separate satellites among the multiple satellites.

9. The system of claim 8 wherein the second set-top box is configured to receive geographical rules from the content provider, and modify a behavior of the second set-top box based on the geographical rules.

10. The system of claim 8 wherein a signal of the first plurality of signals includes multimedia content.

11. The system of claim 8 wherein a signal of the first plurality of signals includes a programming schedule for multimedia content.

12. The system of claim 8 wherein the first set-top box receives the first plurality of signals through a plurality of satellites.

13. The system of claim 8, further comprising:
a third set-top box configured to receive a third plurality of signals from the content provider and measure signal strengths of the third plurality of signals, the third set-top box located within a second geographical area,
the content provider being further configured to receive the measured signal strengths of the third plurality of signals, and create a second geographical model for the second geographical area using the measured signal strengths of the third plurality of signals.

14. A set-top box, comprising:
a receiver configured to receive a first plurality of signals and a plurality of geographical models of a plurality of geographical areas from a content provider, wherein the content provider is a single device, wherein the content provider is an only device that provides content in the system, and wherein the content provider is the only device that creates a first geographical model in the system, each of the plurality of geographical models including a plurality of expected signal strengths for a respective geographical area of the plurality of geographical areas, each of the first plurality of signals is received from a different satellite among multiple satellites; and
a controller configured to measure signal strengths of the first plurality of signals, compare the measured signal strengths of the first plurality of signals to the plurality of expected signal strengths of each of the plurality of geographical models, and determine which of the plurality of geographical areas the set-top is located within based on the comparison of the measured signal strengths of the first plurality of signals to the plurality of expected signal strengths of each of the plurality of geographical models,
wherein the expected signal strength measurements include average signal strength measurements, threshold signal strength measurements, and no signal, wherein various expected signal strengths are associated with separate satellites among the multiple satellites.

15. The set-top box of claim 14 wherein
the receiver is further configured to receive a plurality of geographical rules from the content provider, and
the controller is further configured to modify a behavior of the set-top box based on the determined geographical area the set-top box is located within and the geographical rules.

16. The set-top box of claim 15 wherein the modification of the behavior of the set-top box includes content being restricted from being displayed to a user or a notification being displayed to the user.

17. The set-top box of claim 14 wherein an expected signal strength measurement of no signal represents a satellite among the multiple satellites that is beyond reception distance from a set top box.

18. The system of claim 1, wherein the first geographical model further includes an average signal strength in the first geographical area.

19. The system of claim 1, wherein the first geographical model further includes geographical rules for the first geographical area.

20. The system of claim 1, wherein the system determines whether the first geographical model or geographical rules for the first geographical area have been updated.

* * * * *